Dec. 19, 1967     C. W. LARKAM     3,359,465

ELECTROCHEMICAL MICROPHONE

Filed Nov. 4, 1963

INVENTOR.
Charles W. Larkam
BY Richard J. Miller
Atty.

United States Patent Office 3,359,465
Patented Dec. 19, 1967

3,359,465
ELECTROCHEMICAL MICROPHONE
Charles W. Larkam, Austin, Tex., assignor, by mesne assignments, to the United States of America as represented by the Secretary of the Navy
Filed Nov. 4, 1963, Ser. No. 321,380
1 Claim. (Cl. 317—231)

ABSTRACT OF THE DISCLOSURE

The invention disclosed in this application deals with a solion type of transducer wherein there is provided a centrally disposed aperture along which ionizable fluid may flow in either direction under the urging of accoustical waves received at flexible diaphragms at the ends thereof. The electrical elements are disposed normal to said longitudinal axis and include a cathode and a pair of anodes with sensor grids electrically isolated from the cathode and anodes.

---

The invention disclosed in this application deals generally with a solion type of transducer wherein there is provided a centrally disposed aperture along which ionizable fluid may flow in either direction under the urging of accoustical waves received at flexible diaphragms at the ends thereof. Disposed normal to said longitudinal axis are a plurality of electrical elements including a pair of cathodes anodes and sensor grids electrically isolated from the cathodes and anodes.

A variety of acoustical transducers exist in the prior art and include such types as carbon button microphones, velocity-ribbon microphones, condenser microphones, piezoelectric crystal microphones, electrokinetic acoustic transducers, solion logarithmic detectors and solion linear full-wave detectors which can be made to work with varying degrees of success at the lower acoustical range.

Many problems exist such as in the carbon button microphones which have relatively high power output and low frequency response, but have too high an internal noise level to be satisfactory with low amplitude signals. Piezoelectric crystal type microphones require impossibly high input impedances of their preamplifiers when they are operated at low frequencies. A condenser microphone can be operated in a frequency modulated mode to have good low frequency response, but the auxiliary electronic equipment required is rather elaborate.

The transducers based on streaming potential in solution have such low power output as to require elaborate preamplifiers, complicated by the possibility of having to deal with a relatively large direct current component in the transducer output. The solion logarithmic acoustic detector has a high powered gain but does not have a long range of flat frequency responses, nor does it faithfully reproduce the form of the input signal. Conventional solion full-wave linear acoustic detectors of the polarized cathode type are excellent from the standpoint of power output and low frequency response; but as frequency is increased, their sensitivity falls off seriously even before the lower limits of the audio range is reached.

Previously described solion acoustic transducers employing a reduction-oxidation or redox chemical system, such as an $I_2$-KI solution, operate on the principle of flow rate detection. An output cathode which is relatively sheltered from the bulk solution is biased to reduce essentially all of the $I_2$ carried to its surface. The output current is proportional to the rate of $I_2$ reduction. An anode placed in the bulk fluid generates $I_2$ at exactly the rate at which depletion occurs at the cathode. A detector intended to have an output which is linearly dependent upon pressure is so constructed that the rate of electrolyte flow passed the output cathode will be directly proportional to pressure. This condition is met by having the fluid friction in the cathode region, rather than the stiffness of the diaphragms offer the controlling restraint to the motion of the fluid. Since, then, the rate of $I_2$ supply to the cathodes equals the product of the fluid flow rate and the concentration of $I_2$ in this fluid, the current output will be directly proportional to the pressure acting across the detector, provided that the $I_2$ concentration level remains constant.

It is obvious that the concentration of $I_2$ in the region around the cathode cannot remain constant, since the essential action of the cathode is to deplete substantially all of the $I_2$ from the fluid passing it. As long as the fluid flow continues in the same direction, this depletion presents no difficulty. The practical application of the transducer, however, involves alternating flow, causing spent liquid to wash back over the cathode which depleted it. During the half cycle, output of the opposite polarity is furnished by another cathode in a detector consisting of two half-wave linear detectors placed back-to-back. Such a device is very satisfactory for low frequencies. The depleted electrolyte then has time, before its next pass over the cathode, to have its $I_2$ concentration built up again by diffusion of this species from the bulk fluid. But the time available for restoration of the concentration of $I_2$ in a fluid element making repeated passes over a cathode is inversely proportional to the frequency of the applied pressure signal. The failure of the $I_2$ concentration of fluid swept past the cathode to remain constant at its bulk fluid value accounts for the attenuation of sensitivity of a conventional solion linear acoustic detector with increasing frequency.

It is therefore an object of this invention to provide an improved solion detector.

It is further an object of this invention to provide a displacement type solion acoustic transducer having improved frequency response characteristics in the lower audio frequency range.

It is yet a further object of this invention to provide a displacement type solion acoustic transducer wherein the sensor elements do not alter by any appreciable degree the concentration of ions adjacent to the sensor elements.

It is still a further object of this invention to provide a transducer comprising, a housing including a body portion having an aperture therethrough, a pair of diaphragms affixed to the housing, electrolyte containing a redox pair confined within the aperture and between the diaphragms, a cathode in the aperture, an anode in the aperture, means for establishing a potential between the cathode and the anode and a pair of sensing electrodes electrically isolated from the potential establishing means in the aperture for developing a signal proportional to changes in ion concentration due to motion of the liquid caused by flexing of the diaphragms.

Further objects and advantages of this invention will be apparent from the accompanying specification and drawings wherein like reference numerals refer to like elements and wherein.

Figure 1:
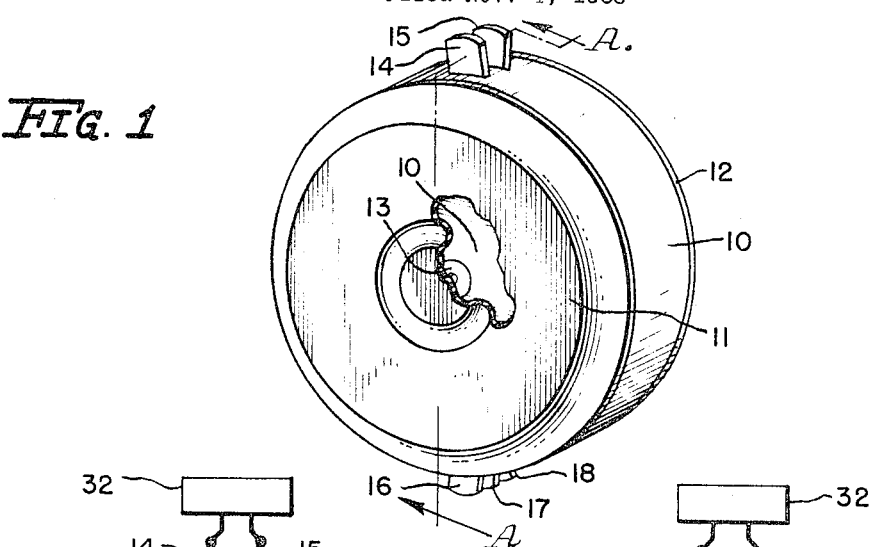
FIG. 1 is a perspective view, partially in cross section of a transducer incorporating the inventions.

Referring now to FIG. 1, wherein is shown a transducer incorporating the invention there is a housing 10 and first and second diaphragms 11, 12 sealed to the housing 10 by any appropriate means which will prevent liquid from escaping. A cutaway portion of diaphragm 11 shows housing 10 and a plate 13 whose purpose will be explained hereinafter. In addition a pair of electrodes 14 and 15 extend from the housing 10 and three electrodes 16, 17 and 18 extend from the lower portion of the housing. The electrodes are provided for producing the necessary ionization in liquid contained within the housing and for deriving a signal as hereinafter set forth.

Figure 2:
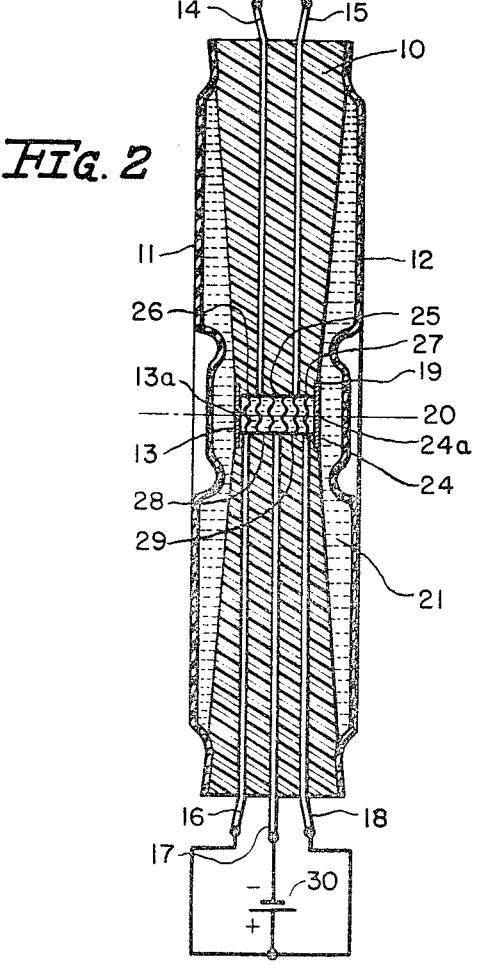
FIG. 2 is a cross-section view along lines 2—2 FIG. 1.

FIG. 2 is a cross sectional view of the embodiment shown in FIG. 1 along lines 2—2 of FIG. 1. An aperture in housing 10 generally designated by the number 19 extends along an axis 20 of housing 10. In absence of any of the other structure in the device this allows free passage of electrolyte from the area adjacent to diaphragm 11 to diaphragm 12 and back again under the urging of pressure waves received by either of the diaphragms. In addition to plate 13 having a small aperture 13a therein, a plate 24 is provided having an aperture 24a which restricts the flow from one side of the transducer to the other in a predetermined manner. A cathode, in this case composed of two grid-like structures, 25 is centrally disposed within the aperture 19 substantially at right angles to axis 20 and is connected to lead 17. A pair of anodes 26, 27 are provided adjacent to plates 13, 24 which are of an open mesh construction and are connected to leads 16, 18 respectively. In addition there are a pair of sensor grids 28, 29 coupled to leads 14, 15. Sensor element 28 is spaced between cathodes 25 and anode 26 while sensor element 29 is spaced between cathode 25 and the anode 27.

A battery 30 having its negative terminal coupled to lead 17 and its positive terminal connected to leads 16, 18 provides a bias between the cathode and the two anodes which serve to establish an electrochemical potential gradient within the transducer.

The electrical circuit is completed by coupling a relatively high input impedance read out device 32 to leads 14, 15. A load impedance as low as 5000 ohms can be tolerated if the cell is made to draw a few milliamperes of bias current.

In operation a transducer such as that shown in FIG. 2 might be submerged in a body of water such that its right diaphragm 12 would receive acoustical signals represented by changes in pressure in the surrounding water, while its left diaphragm 11 was in contact with an acoustical ground. Increased input pressure would cause the diaphragms to flex toward the left with accompanying flow of the confined electrolyte toward the left also. The bias voltage connected to the terminals 16, 17, 18 converts $I_2$ to $I^-$ in the region adjacent to cathode 25 and simultaneously converts $I^-$ to $I_2$ in the regions adjacent to anodes 26 and 27. The displacement of electrolyte to the left therefore causes sensor element 29 to be surrounded by solution having a higher $I_2/I^-$ ratio than the solution contacting sensor element 28. The electrochemical potential at probe 29 is thus higher than at probe 28 and the difference appears as an output signal voltage between terminals 14, 15. From the symmetry of FIG. 2 it is apparent that a decrease of input pressure will cause electrolyte flow in the reverse direction and result in an output voltage of the opposite polarity.

Figure 3:
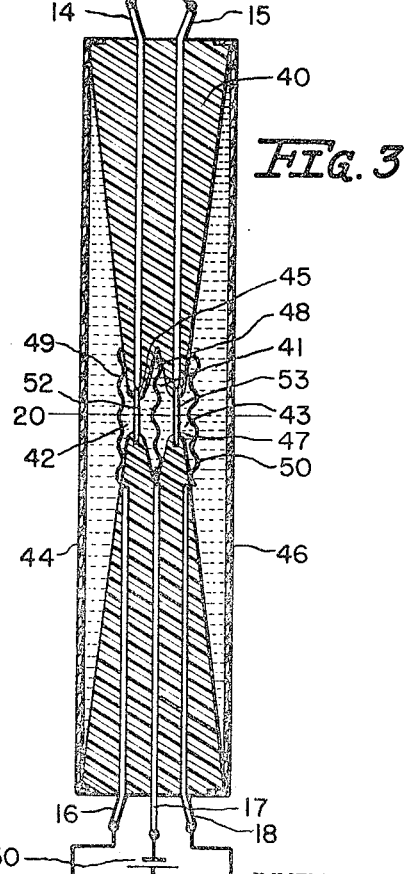
FIG. 3 shows a second embodiment of the invention in cross section.

The embodiment in the invention shown in FIG. 3 has a body portion 40 of different configuration than that shown in FIG. 2. A central chamber 41 and a pair of chambers 42, 43 are alined along an axis 20 extending from an aperture through the housing 40 and chambers 42 and 43 may be considered as closed by a pair of diaphragms 44, 45. Chamber 42 is connected to chamber 41 through an orifice or constriction 45 and chamber 41 is connected to chamber 43 through a constriction or orifice 47. A cathode structure 48 disposed substantially perpendicular to axis 20 is a fine grid-like structure and is connected to battery 30 by lead 17. A pair of anode structures 49, 50, are similar to the cathode structure. The anodes are connected to the positive terminal of battery 30 through the leads 16, 18. Sensor elements 52, 53 are the conducting inner surfaces of the orifices 45, 47, and are connected to leads 14, 15. A read out device 32 is also connected to terminals 14, 15.

FIGURES 2 and 3 illustrate two of the many possible configurations of a device embodying the essential features of this invention. In both devices a non-uniform electrochemical potential field is set up in an electrolyte containing a soluble redox pair. In both devices, a differential pressure applied across the diaphragms causes a displacement of the potential field with respect to potential sensing probes. The two embodiments differ in that the magnitude of the fluid displacement in the device of FIG. 3 is limited by diaphragm stiffness. This device is intended for operation at frequencies high enough that the potential field does not have time to migrate appreciably through the fluid during one half cycle of the acoustic signal.

The device of FIG. 2 has a very compliant diaphragm but offers a high frictional resistance to fluid flow between its two side chambers. The displacement of the potential field in this device represents an equilibrium between the restricted fluid velocity induced by the pressure and the counter migration of the field through the fluid under the influence of the applied bias. Thus the potential field displacement is proportional to the pressure although the velocity rather than the displacement of the fluid is what follows the input pressure in this case.

I claim:

A transducer, comprising:
(a) a housing including a body portion having an elongate aperture therethrough along a longitudinal axis;
(b) a pair of flexible diaphragms affixed to said housing at opposite ends of said aperture;
(c) a redox system electrolyte filling the space within said aperture and between said diaphragms; and flowable along said axis in a straight flow path in either direction;
(d) a grid-like plate cathode transverse to said axis within said aperture;
(e) a pair of members having alined orifices therein individually positioned over the respective exits of said aperture;
(f) a pair of grid-like anodes individually spaced between said cathode and said respective members;
(g) means for establishing a potential between said cathode and anodes for oxidizing components of said electrolytes in area adjacent to said anodes and reducing components of said electrolyte in areas adjacent said cathode; and
(h) a pair of perforated platelike sensing electrodes disposed across said aperture in respective locations between and spaced from said cathode and each respective anode for developing a signal proportional to the difference in ion concentrations in said respective locations due to displacement of said electrolyte through said aperture in response to flexing of said diaphragms.

References Cited

UNITED STATES PATENTS 2,896,095  7/1959  Reed et al.
3,157,832  11/1964  Hurd _____ 317—231

JAMES D. KALLAM, *Primary Examiner.*